United States Patent
Huang (10) Patent No.: US 11,967,258 B2
(45) Date of Patent: Apr. 23, 2024

(54) WEARABLE DISPLAY APPARATUS AND DRIVING METHOD THEREOF

(71) Applicant: SEEYA OPTRONICS CO., LTD., Shanghai (CN)

(72) Inventor: Zhongshou Huang, Shanghai (CN)

(73) Assignee: SEEYA OPTRONICS CO., LTD., Shanghai (CN)

( * ) Notice: Subject to any disclaimer, the term of this patent is extended or adjusted under 35 U.S.C. 154(b) by 70 days.

(21) Appl. No.: 17/810,863

(22) Filed: Jul. 6, 2022

(65) Prior Publication Data

US 2023/0008359 A1     Jan. 12, 2023

(30) Foreign Application Priority Data

Jul. 7, 2021   (CN) .......................... 202110768044.9

(51) Int. Cl.
    *G09G 3/00*           (2006.01)
    *G02B 27/01*         (2006.01)
    *G06F 3/01*           (2006.01)

(52) U.S. Cl.
CPC ......... *G09G 3/002* (2013.01); *G02B 27/0172* (2013.01); *G06F 3/013* (2013.01); *G02B 2027/0174* (2013.01); *G09G 2320/0626* (2013.01); *G09G 2320/0666* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 10,209,520 | B2 * | 2/2019 | Bell ................... | G02B 27/0172 |
| 10,534,173 | B2 * | 1/2020 | Jepsen ................ | G02F 1/13306 |
| 11,366,321 | B1 * | 6/2022 | Grundhoefer ....... | G02B 27/0172 |
| 2017/0017082 | A1 * | 1/2017 | Wakabayashi ....... | G02B 27/017 |
| 2019/0018481 | A1 * | 1/2019 | Aleem .................. | G06V 40/19 |
| 2019/0387181 | A1 * | 12/2019 | Qiu ..................... | H04N 5/2628 |
| 2022/0179211 | A1 * | 6/2022 | Peng .................... | G02B 6/005 |
| 2022/0270548 | A1 * | 8/2022 | Kurokawa ......... | H10K 59/1213 |
| 2023/0007991 | A1 * | 1/2023 | Huang ............... | G02B 27/0172 |
| 2023/0011656 | A1 * | 1/2023 | Huang .................. | G02B 6/005 |

FOREIGN PATENT DOCUMENTS

| | | | | |
|---|---|---|---|---|
| CN | 113109947 | A * | 7/2021 | ......... G02B 27/0172 |
| CN | 215416101 | U * | 1/2022 | ......... G02B 27/0172 |
| CN | 216052261 | U * | 3/2022 | ......... G02B 27/0101 |

* cited by examiner

*Primary Examiner* — Fred Tzeng
(74) *Attorney, Agent, or Firm* — DUANE MORRIS LLP (57) ABSTRACT

A wearable display apparatus includes a control unit, a display unit, a light transmission unit, a semi-transparent photodetector unit and a signal processing unit. The display unit includes multiple light-emitting elements and is controlled by the control unit and outputs an optical image; the light transmission unit delivers the optical image to human eyes; the semi-transparent photodetector unit converts the light reflected from the human eyes to an electrical signal which includes information regarding the health status and gazing direction of the human eyes; the signal processing unit extracts information through analyzing the electrical signal and transmits the information to the control unit; the control unit adjusts an output image of the display unit in real time according to the information; and the light transmission unit and the semi-transparent photodetector unit propagate the external light beams to the human eyes.

15 Claims, 9 Drawing Sheets

WEARABLE DISPLAY APPARATUS AND DRIVING METHOD THEREOF

CROSS-REFERENCE TO RELATED APPLICATION(S)

This application claims priority to Chinese Patent Application No. 202110768044.9 filed Jul. 7, 2021, the disclosure of which is incorporated herein by reference in its entirety.

TECHNICAL FIELD

The present disclosure relates to display technology and, in particular, to a wearable display apparatus and a driving method thereof.

BACKGROUND

In recent years, with the development of an augmented reality (AR)/virtual reality (VR) technology, the application fields of the AR/VR technology have been expanded rapidly, especially in the fields of security monitoring, medical surgery and video games, where the AR/VR technology has become a key driving force.

To further develop an AR system, tracking a gaze and eye movement have become a powerful means of providing more important information and enhancing visual experience. When observing an image, human eyes constantly scan the image and gaze on an object or a person of interest, the AR system can find out in real time this information close related to the object or person of interest, and synchronously display the information around the gazing spot or superimpose the information on an original image. However, a conventional gaze tracking device is relatively bulky and heavy to be integrated into a small and lightweight AR glasses, or the attempt of such integration faces tremendous technical challenges in terms of engineering design, manufacturing and packaging.

In another aspect, because of extensive use of human eyes due to popularization of mobile phones and various electronic display technologies, aging symptoms such as age-related macular degeneration (AMD), which may originated from damages of optical nerve cells in the retina by over exposure of blue light, are increasingly common and even developed at a younger age. If an AR/VR glasses can monitor in real time an accumulated exposure of blue light, brightness and chromaticity of incident light can be adjusted in a user based manner, so as to mitigate the aging process of visual system. It is reported that, cone cells in the retina that are sensitive to red, green and blue light, respectively, have different aging speed. For instance, the cone cells that are most sensitive to blue light decay faster than the rest cone cells. As a result, the perceived color of the image may gradually change with age. If such a change in color response is detected, the chromaticity of an image can be re-tuned to compensate the change in color response. However, a conventional detection device for color response is generally available on in an optometry clinic or ophthalmology department in a general hospital, and is quite bulky and heavy to be integrated into any wearable device.

SUMMARY

Embodiments of the present disclosure provide a wearable display apparatus and a driving method thereof. The wearable display apparatus is integrated into in an AR/VR glasses, and has a capability of adjusting an output image of a display unit in real time according to characteristics of light reflected from human eyes. These characteristics include temporal and spatial distributions of a light intensity and chromaticity. The adjustment in display image provides not only an enhanced or optimized visual experience with the AR/VR glasses, but also a protection mechanism for human vision system against over exposure induced aging symptoms. In addition, the wearable display apparatus is compact, light weighted, and in low cost.

The wearable display apparatus includes a control unit, a display unit, a light transmission unit, a semi-transparent photodetector unit and a signal processing unit.

The display unit includes the plurality of light-emitting elements and is controlled by the control unit and output the optical image, and the light transmission unit and the semi-transparent photodetector unit propagate the external light beam to the human eyes so that the optical image of the display unit is superimposed with an external real image, achieving an AR display performance. The light transmission unit delivers the optical image to the human eyes so that the human can see the optical image. The semi-transparent photodetector unit converts the light reflected from the human eyes to electrical signal which contains information regarding the health status and gazing direction of the human eyes. The signal processing unit extracts important information through analyzing the electrical signal. The control unit adjusts the output image of the display unit in real time according to the information provided by the signal processing unit, thereby enhancing and optimizing the visual experience of an image, protecting vision, ensuring safe driving.

DETAILED DESCRIPTION

The present disclosure is further described hereinafter in detail in conjunction with drawings and embodiments. It is to be understood that the embodiments described herein are intended to illustrate and not to limit the present disclosure. Additionally, it is to be noted that for ease of description, only part, not all, of the structures related to the present disclosure are illustrated in the drawings.

Terms used in embodiments of the present disclosure are intended only to describe embodiments and not to limit the present disclosure. It is to be noted that nouns of locality such as "above", "below", "left" and "right" in the embodiments of the present disclosure are described from angles shown in the drawings and are not to be construed as limiting the embodiment of the present disclosure. Additionally, in the context, it is to be understood that when an element is formed "above" or "below" another element, the element can not only be directly formed "above" or "below" the other element but also be indirectly formed "above" or "below" the other element via an intermediate element. Terms such as "first" and "second" are used only for the purpose of description to distinguish between different components and not to indicate any order, quantity or importance. For those of ordinary skill in the art, specific meanings of the preceding terms in the present disclosure may be understood based on specific situations.

The term human eyes in the embodiments of the present disclosure include external tissues, eyeballs and retinal tissues of the human eyes. The external tissues include upper and lower eyelids. The eyeballs include conjunctivae, irises, corneas, pupils, lenses and vitreous bodies. The retinal tissues include macular regions, retinae, choroids, retinal vessels and optic nerves. The term light in the embodiments of the present disclosure includes light radiation of wavelengths from infrared light to visible light and to near ultraviolet light. Terms as for interaction between human eyes and light should include interaction between various tissues of the human eyes and light beams of various wavelengths. For example, light beam reflected from the human eyes includes various light wavelengths that may be reflected from the eyelids or the macular regions on the retinae.

Figure 1:
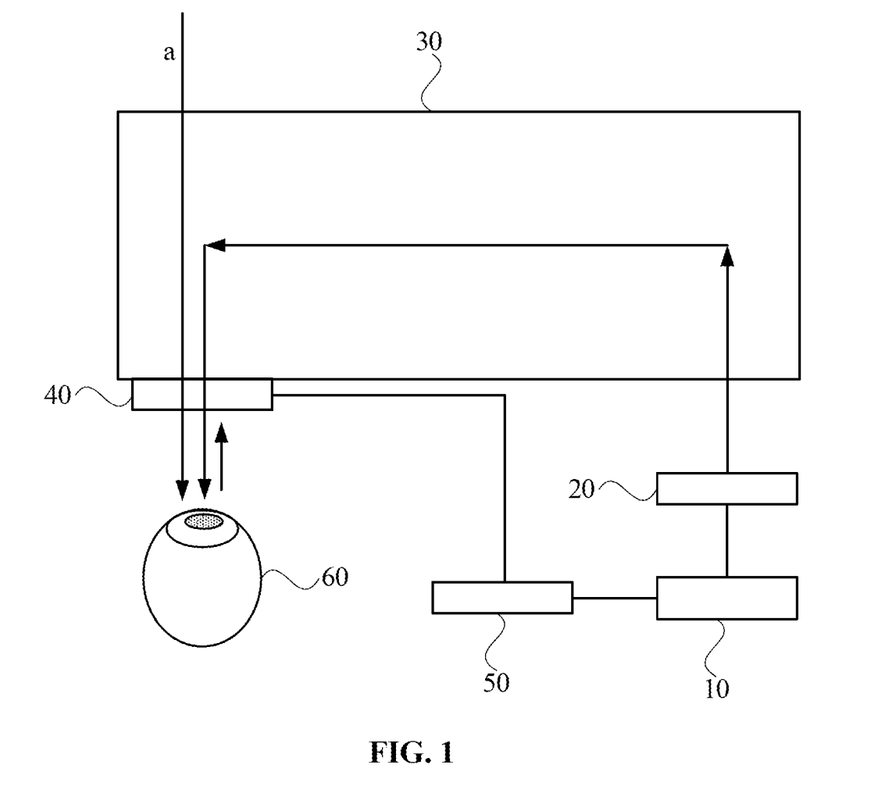
FIG. 1 is a structure view of a wearable display apparatus according to an embodiment of the present disclosure.

FIG. 1 is a structure view of a wearable display apparatus according to an embodiment of the present disclosure. Referring to FIG. 1, the wearable display apparatus provided in this embodiment includes a control unit 10, a display unit 20, a light transmission unit 30, a semi-transparent photodetector unit 40 and a signal processing unit 50. The control unit 10 is connected to the display unit 20 and controls the display unit 20 to output an optical image, and the display unit 20 includes a plurality of light-emitting elements (not shown in FIG. 1); the light transmission unit 30 delivers the optical image to human eyes 60; the semi-transparent photodetector unit 40 is disposed on a side of the light transmission unit 30 facing towards the human eyes 60 and converts light reflected from the human eyes 60 to an electrical signal; the signal processing unit 50 is connected to the semi-transparent photodetector unit 40 and extracts information through analyzing the electrical signal and sends the electrical signal to the control unit; the control unit 10 is connected to the signal processing unit 50 and adjusts data of an output image of the display unit 20 in real time including brightness and color according to the information; and the light transmission unit 30 and the semi-transparent photodetector unit 40 propagate an external light beam a to the human eyes 60.

The wearable display apparatus may be an AR display. The control unit 10 may include an image processing chip and controls the display unit 20 to output the optical image according to a preset program, where the optical image may be a static image or a video image and specifically determined according to a usage scenario of the wearable display apparatus. The control unit 10, the display unit 20, the light transmission unit 30, the semi-transparent photodetector unit 40 and the signal processing unit 50 may be integrated into a housing such as a helmet. The light-emitting element may be an organic light-emitting diode (OLED). In specific implementations, to reduce a volume of the display unit 20, the display unit 20 includes a silicon-based organic light-emitting display panel. A pixel driving circuit, row scan lines, data lines and external power supply lines are all integrated into a silicon chip. An OLED thin film is deposited on the silicon chip through thin film evaporation or the like. The light transmission unit 30 folds a light path and includes necessary reflective surfaces, transmission channel and the like or structures having equivalent functions. The light transmission unit 30 delivers the optical image and the external light to the human eyes 60 for imaging. The semi-transparent photodetector unit 40 may include a plurality of photoelectric sensors and may convert the light reflected from the human eyes 60 to the electrical signal and feed the electrical signal back to the signal processing unit 50 so that a state of the human eyes 60 is acquired, for example, a healthy state of the human eyes is detected, a line of sight orientation of the human eyes is acquired, and the like. The control unit 10 adjusts a drive signal according to the information fed back from the semi-transparent photodetector unit 40, so as to adjust a to-be-displayed image. The light transmission unit 30 and the semi-transparent photodetector unit 40 have certain transmittance and may deliver the external light to the human eyes, thereby achieving an AR display performance.

According to the technical solutions in the embodiment of the present disclosure, the control unit controls the display unit to output the optical image; the light transmission unit and the semi-transparent photodetector unit delivers the external light to the human eyes so that the optical image of the display unit is superimposed with an external real image, achieving the AR display performance; the light transmission unit delivers the optical image to the human eyes so that the human can see the optical image; the semi-transparent photodetector unit converts the light reflected from the human eyes to the electrical signal to detect the healthy state or line of sight orientation of the human eyes; the signal processing unit extracts important information through analyzing the electrical signal and sends the information to the control unit; and the control unit adjusts the output image of the display unit in real time according to the information, thereby enhancing and optimizing the visual experience of an image, protecting vision, ensuring safe driving.

Optionally, the semi-transparent photodetector unit includes a semi-transparent photoelectric detector; where the semi-transparent photoelectric detector includes a plurality of detection regions and a plurality of transparent regions, each of the plurality of detection regions includes a photoelectric sensor and a driver circuit, and a sum of areas of the plurality of transparent regions is greater than or equal to 30% and less than or equal to 90% of an area of the semi-transparent photoelectric detector.

Figure 2:
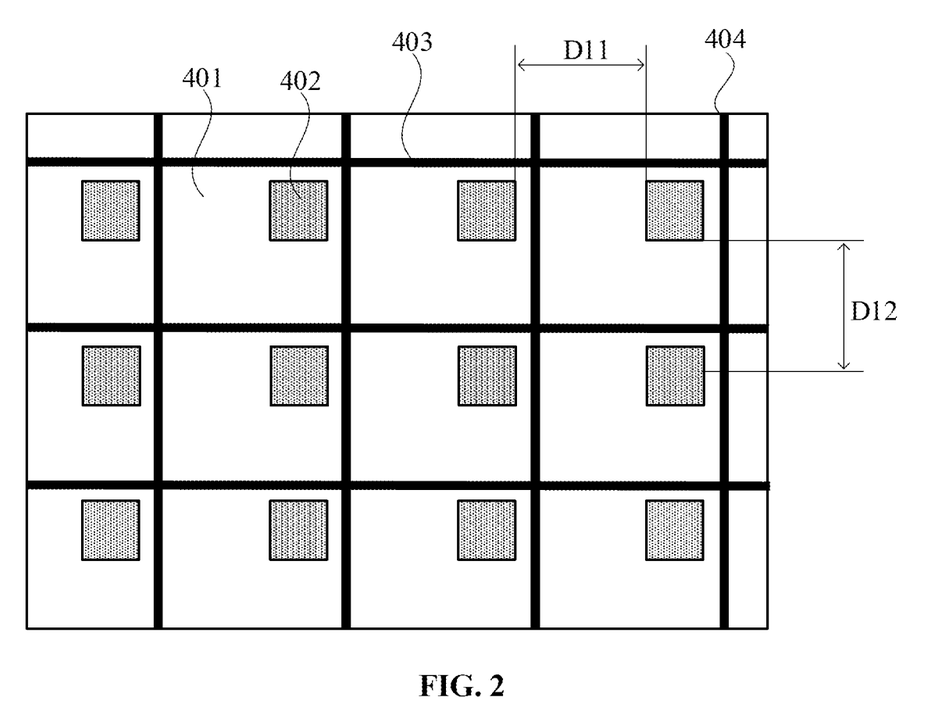
FIG. 2 is a top view of a semi-transparent photodetector unit according to an embodiment of the present disclosure.

Exemplarily, FIG. 2 is a top view of a semi-transparent photodetector unit according to an embodiment of the present disclosure. Referring to FIG. 2, the semi-transparent photodetector unit includes a plurality of transparent regions 401 and a plurality of detection regions 402, the detection region 402 includes a photoelectric detector and the driver circuit (whose specific structures are not shown in FIG. 2) as well as first wires 403 and second wires 404 which are connected to the photoelectric detector and deliver control signals or data signals. The sum of the areas of the transparent regions is configured to be 30% to 90% of the area of the semi-transparent photoelectric detector, which can ensure that the semi-transparent photodetector unit has sufficient transmittance to deliver the external light to the human eyes.

Optionally, the plurality of detection regions 402 and the plurality of transparent regions 401 are each arranged in a periodic array, all adjacent detection regions 402 have the same distance, and the number of the plurality of detection regions 402 is substantially the same as the number of the plurality of transparent regions 401.

In specific implementations, D11 and D12 are greater than or equal to a distance between pixels of an image of the display unit projected on a plane of the photoelectric sensor and are twice greater than a distance between adjacent grids within an output coupling grating, so as to avoid more fringes. Transverse first wires 403 (control lines) and longitudinal second wires 404 (data buses) are arranged in regions between photoelectric sensors. These data buses and control lines may be made of a metal or a transparent conductive material such as indium tin oxide (ITO). Wires made of the metal such as an aluminum alloy or metal copper or chromium or molybdenum have very low resistivity and thus can be made relatively thin such as 0.5 microns to 2 microns so that the transmittance of an array of photoelectric sensors decays relatively little. The transparent conductive material such as ITO has relatively high resistivity such as a sheet resistance of 10 ohms and can be made relatively wide due to high transmittance of visible light, and even most of the transparent regions can cover wires made of a transparent conductive film ITO. A color filter may be added on a photosensitive surface of the photoelectric sensor so that a photoelectric signal for light of a color of the color filter is obtained. In the array of photoelectric sensors, color filters of different colors are used on different sensors so that spatial distribution information of colors such as R, G and B can be obtained.

Figure 3:
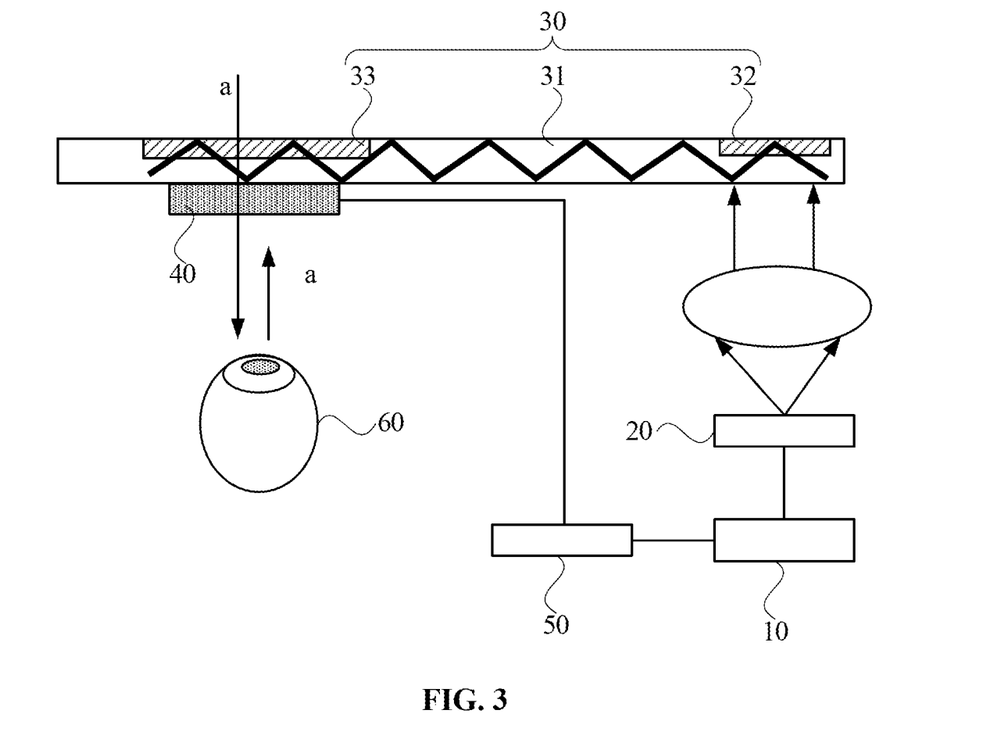
FIG. 3 is a structure view of another wearable display apparatus according to an embodiment of the present disclosure.

FIG. 3 is a structure view of another wearable display apparatus according to an embodiment of the present disclosure. Referring to FIG. 3, the light transmission unit 30 includes at least one optical waveguide 31 (one waveguide is illustrated in FIG. 3) for propagating an optical image, a first input coupler 32 for inputting the optical image into the optical waveguide 31, and an output coupler 33 for outputting the optical image to the human eyes 60 through the semi-transparent photodetector unit 40; and the semi-transparent photodetector unit 40 is disposed on a side of the output coupler 33 facing towards the human eyes 60, and the semi-transparent photodetector unit 40 and the output coupler 33 are configured to deliver the external light beam a to the human eyes 60.

The first input coupler 32 is disposed at an incident window of the optical waveguide 31, and the output coupler 33 is disposed at an output window of the optical waveguide 31. Optionally, each of the first input coupler 32 and the output coupler 33 includes a surface relief grating (SRG) or a volumetric holographic grating (VHG). A waveguide using such a planar diffraction grating is also referred to as a diffraction waveguide, which differs from a geometrical optical waveguide depending on a total reflection principle of an interface between an optically dense medium and an optically thin medium. Through the first input coupler 32, light carrying the optical image is totally reflected at a propagation angle greater than a total reflection angle on interfaces of the optical waveguide 32 on both sides and propagated forwards. The output coupler 33 is disposed at an end of propagation to project laterally propagated light onto retinae of the human eyes 60. In other embodiments, to reduce a rainbow effect, that is, a color separation phenomenon caused by different refractive indexes of light of three colors R, G and B in a transparent material, three waveguides may be used for delivering light of different colors, respectively. It is to be understood that since the optical waveguide 31 is disposed between the output coupler 33 and the human eyes 60, the semi-transparent photodetector unit 40 may be attached to a surface of the optical waveguide 31 in practice.

The wearable display apparatus provided in this embodiment may detect the healthy state of the human eyes, specifically, a healthy state of the retinae. In a certain embodiment, the signal processing unit 50 includes a retinal health manager, where the retinal health manager is configured to generate a feedback signal according to information about light radiation reflected from the human eyes and detected by the semi-transparent photodetector unit 40, and the control unit 10 adjusts brightness and/or a color of light emitted by the display unit 20 in real time according to the information.

In this embodiment, the semi-transparent photodetector unit includes the plurality of detection regions made of a semiconductor material and the plurality of transparent regions which are uniformly distributed and is disposed on an outer side of the output coupler 33 facing towards an observer. External light from a natural scene and the optical image of the display unit 20 propagated through the optical waveguide 31 are delivered through the transparent regions from the same size of the semi-transparent photodetector unit 40 into the human eyes 60. A part of light beam b reflected back from a surface of an eyeball and an internal retina enters the detection regions of the semi-transparent photodetector unit 40, so as to produce photo-generated charges (a photoelectric effect) or a photo-voltage (a photovoltaic effect). In a conventional method, accumulative light radiation is estimated either from a time for which a display is lit or from external light received by a photoelectric sensor. However, blinks, a short rest with eyes closed or a short sleep cannot be perceived through conventional approaches. On the contrary, whether there is light incident on the retina can be known according to differences in intensity and spectrum between light reflected from an eyelid and light reflected from the retina so that light radiation information of the retina can be grasped more accurately from at least three parameters or three dimensions: an exposure amount, spectral information and an exposure time.

The generated photoelectric signal is outputted to the retinal health manager. Optionally, the retinal health manager includes an exposure integrator for light of a plurality of colors, an analog-to-digital converter and a memory that stores mathematic models regarding aging and damage mitigation in retina. An instruction to modify a video signal is outputted to the control unit 10, so as to adaptively adjust an intensity and color of output light of the display unit 20.

One practical application of this embodiment is to monitor the fatigue of a driver or machine operator. When the driver or machine operator is too tired, a physiological phenomenon including a short eye closure and a doze occurs. In this embodiment, when the physiological phenomenon is perceived, a relevant warning system may be notified so that the driver or machine operator is forced awake, or an automatic control system directly takes over a vehicle or aircraft to prevent an accident. Signs for the short eye closure and the doze are slowed eyeball movement and a significantly reduced scanning frequency and amplitude of the line of sight regardless of open eyes. In this embodiment, such signs can be accurately detected so that the driver or control system is warned.

Figure 4:
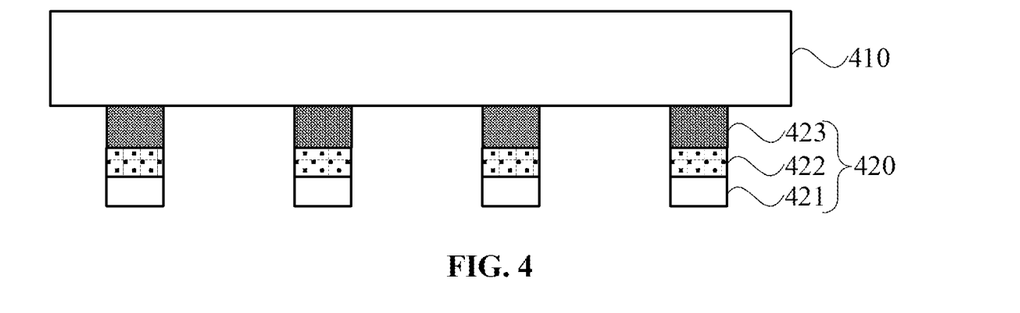
FIG. 4 is a sectional view of a semi-transparent photodetector unit according to an embodiment of the present disclosure.

In specific implementations, to prevent interference of an incident real image and an internal electronic image with photoelectric conversion of the reflected light, at least one opaque thin film may be provided on a side of the semi-transparent photodetector unit facing away from eyeballs of the observer which may be covered by, for example, an opaque metal thin film Mo or Al, and a transparent conductive film covers a side of the semi-transparent photodetector unit facing towards the eyeballs of the observer so that light from the eyeballs can be received. Exemplarily, FIG. 4 is a sectional view of a semi-transparent photodetector unit according to an embodiment of the present disclosure. Referring to FIG. 4, the semi-transparent photodetector unit includes a transparent substrate 410 and a photoelectric sensor 420 on a side of the transparent substrate 410, where the photoelectric sensor 420 includes a transparent electrode 421, a semiconductor film 422 and an opaque electrode 423, and the opaque electrode 423 is disposed on a side of a photosensitive surface of the photoelectric detector 420 facing away from the human eyes.

In addition, a filter of any wavelength may not cover a side of each photoelectric sensor 420 facing towards the human eyes so that the photoelectric sensor 420 can detect reflected light of all wavelengths from infrared light to blue light. A color filter may also cover the side of the photoelectric sensor 420 facing towards the human eyes so that intensities of reflected light of different colors can be obtained. A wavelength of incident light that ages or damages the retinae of the human eyes is closely correlated to energy of photons so that different light radiation spectra need to be treated separately for health management of the retinae. More blue light components have greater damages to the retinae, while red light has a certain repairing and healing effect (red light therapy) on both rod-like and conical optic cells. This is because red light, such as red light with a wavelength of 625 nm to 635 nm or near infrared light with a wavelength of about 850 nm, can act on mitochondrion in optic nerve cells and have a certain activation effect thereon.

Therefore, accumulative exposure energy of a wearer of the wearable display apparatus to blue light and red light is detected so that the retinal health manager can predict accumulative damages of the blue light to the human eyes and warn the wearer or send a spectrum adjustment signal to the control unit 10, so as to change output amounts of various colors R, G and B of a micro display unit and alleviate a continuous impact on optic nerves of the human eyes.

Figure 5:
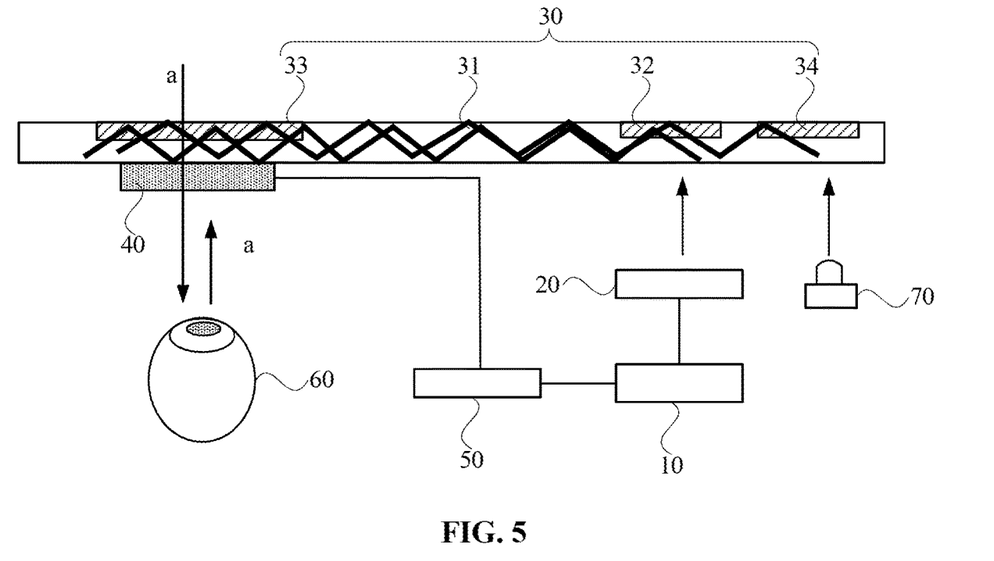
FIG. 5 is a structure view of another wearable display apparatus according to an embodiment of the present disclosure.

In another embodiment, the wearable display apparatus can track a line of sight of the eyeballs to improve a display performance. FIG. 5 is a structure view of another wearable display apparatus according to an embodiment of the present disclosure. Referring to FIG. 5, optionally, the wearable display apparatus further includes a structured light projector 70 and a second input coupler 34 for coupling structured light emitted by the structured light projector 70 into the optical waveguide 31; where the output coupler 33 is further configured to output the structured light to the human eyes 60; the semi-transparent photodetector unit 40 is configured to receive structured light reflected from the human eyes 60; and the signal processing unit 50 includes a structured light processor, where the structured light processor is configured to track a gazing direction of the human eyes 60 according to a distortion of the structured light beam reflected from the human eyes 60, and the control unit 10 adjusts a to-be-displayed image outputted from the display unit 20 according to the gazing direction.

The external light beam from the natural scene and the optical image of the display unit 20 propagated through the optical waveguide 31 are delivered from the output coupler 33 through the transparent regions of the semi-transparent photodetector unit 40 into the human eyes 60 for imaging, achieving the AR display performance. The structured light beam emitted by the structured light projector 70 is coupled by the second input coupler 34 into the optical waveguide 31 and then projected from the output coupler 33 onto the surface of the eyeball and onto the retina through the pupil. A wavelength of the structured light beam may be limited to a particular wavelength such as 800 nm (near infrared (NIR)) or other infrared wavelength bands, and the line of sight of the human eyes may be tracked without interference with the observation of a visible light image by the human eyes. Information about an obtained structured light image is further processed and compared with an original incident structured light image so that the distortion of the reflected structured light beam and a corresponding line of sight axis, or an image position on which the human eyes are focusing is calculated.

Optionally, the structured light beam is in a lattice shape, a grid shape or a parallel stripe shape.

Figure 6:
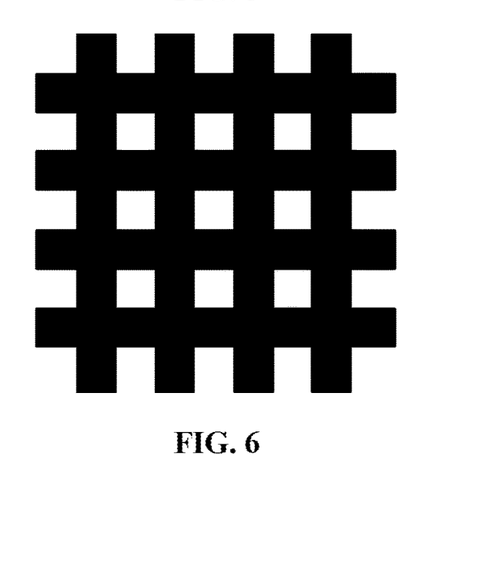
FIG. 6 is a schematic view illustrating a shape of incident structured light according to an embodiment of the present disclosure.
Figure 7:
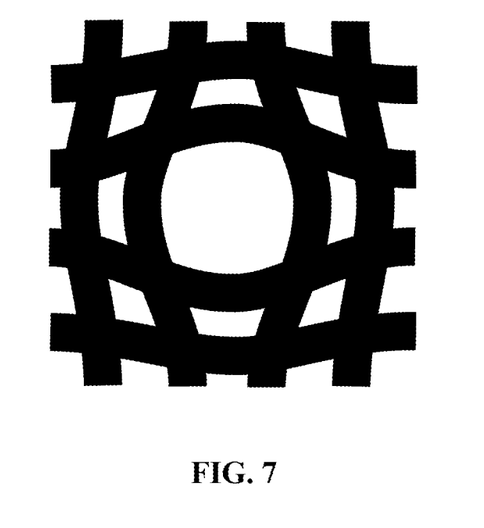
FIG. 7 and FIG. 8 are each a schematic view illustrating a shape of reflected structured light corresponding to FIG. 6.
Figure 8:
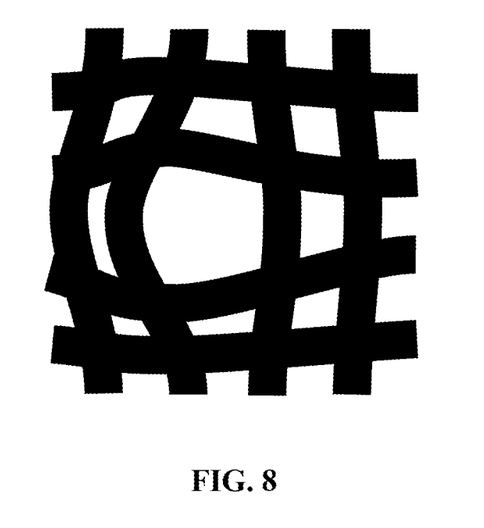

Exemplarily, FIG. 6 is a schematic view illustrating a shape of incident structured light beam according to an embodiment of the present disclosure and FIG. 7 and FIG. 8 are each a schematic view illustrating a shape of reflected structured light beam corresponding to FIG. 6. FIG. 7 shows reflected structured light beam in the case where the line of sight is in the middle and FIG. 8 shows reflected structured light beam in the case where the line of sight is to the left. An actual distortion includes a distortion caused by a curved surface of the eyeball and a distortion due to the reflection of the structured light beam on the retina after passing through the pupil. Therefore, a reflected light image may be more complex. FIGS. 6 to 8 are only views for illustrating principles of this embodiment.

Information about the distortion of the structured light beam is further fed back to the control unit, and image enhancement information is generated by the control unit and sent to the display unit so that important reference information is generated, which is superimposed on an actual image incident outside.

Figure 9:
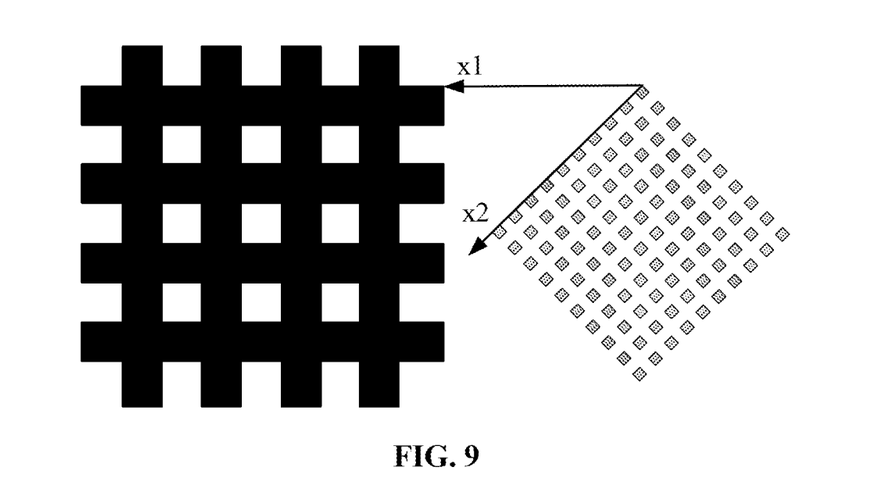
FIG. 9 is a structure view of structured light and an array of photodetector regions according to an embodiment of the present disclosure.

Optionally, the structured light beam is in the grid shape and has a grid line width DL and a grid line period D21; and the semi-transparent photodetector unit includes a plurality of photoelectric detectors arranged in an array, where each photoelectric detector has a width DS and a repeating pitch D11; where D11≤0.5D21, 0.25≤DL/D21≤0.75, and 0.1≤DS/D11≤0.5

After reflected from the surface of the eyeball or a surface of the retina, infrared structured light beam is likely to have thicker stripes. Therefore, to acquire enough information about the distortion in spatial shape of the structured light beam and more energy of the infrared reflected light beam, the preceding conditions need to be met, and a row direction and a column direction of the array remain uniform.

FIG. 9 is a structure view of structured light beam and an array of photodetector regions according to an embodiment of the present disclosure. Referring to FIG. 9, a row direction of the grid shape is a first direction x1, and a row direction of the array formed by the photoelectric detectors is a second direction x2, where an angle between the first direction x1 and the second direction x2 is greater than or equal to 40° and less than or equal to 50°, for example, may be 45°, which is conducive to reducing more interference fringes.

Optionally, the semi-transparent photodetector unit includes the plurality of photoelectric sensors, each of which includes a photodiode or a phototransistor.

Figure 10:
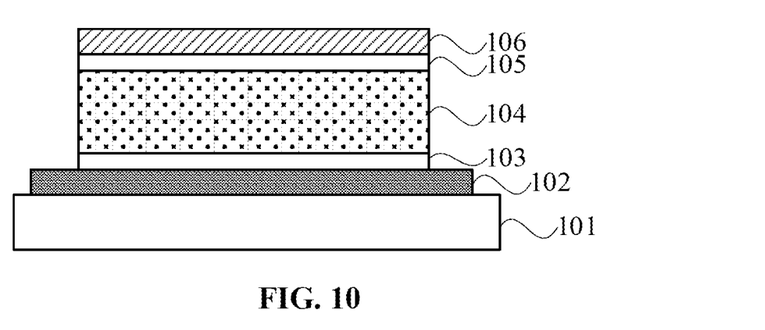
FIG. 10 is a structure view of a photodiode according to an embodiment of the present disclosure.
Figure 11:
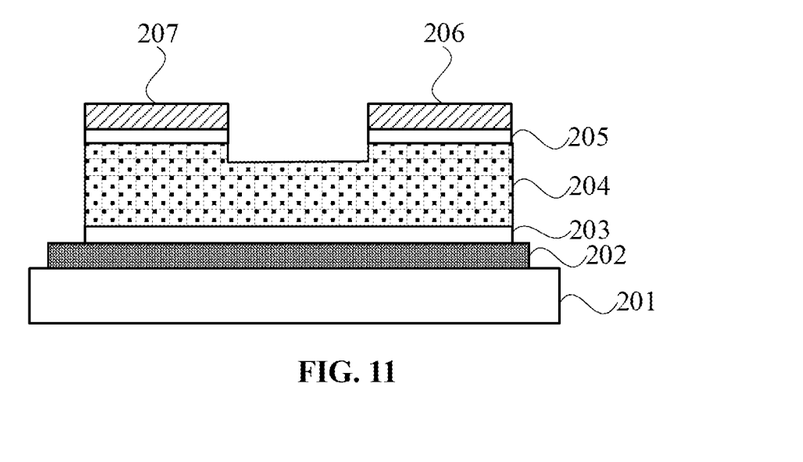
FIG. 11 is a structure view of a phototransistor according to an embodiment of the present disclosure.

When the photoelectric sensors attached to the wearable display apparatus are used for detecting a light flux of the human eyes, a photoelectric response range of the photoelectric sensor mainly includes a semiconductor device sensitive to a visible light beam. Such a device sensitive to the visible light beam may include a photodiode or a phototransistor made of a photoelectric conversion material, hydrogenated amorphous silicon. FIG. 10 is a structure view of a photodiode according to an embodiment of the present disclosure. Referring to FIG. 10, the photodiode includes a transparent substrate 101, an opaque metal electrode 102, an N-type doping layer 103, an intrinsic semiconductor layer 104, a P-type doping layer 105 and a transparent electrode 106. FIG. 11 is a structure view of a phototransistor according to an embodiment of the present disclosure. Referring to FIG. 11, the phototransistor includes a transparent substrate 201, a gate 202, a gate insulating layer 203, a photosensitive region 204, a source-drain doping ohmic layer 205, a source 206 and a drain 207. Since the photoelectric sensors for the wearable display apparatus have a sufficiently large area and can cover all viewing angles of the human eyes, the photodiode or phototransistor made of hydrogenated amorphous silicon and manufactured with a low cost per unit area can be used. However, a common photoelectric device made of hydrogenated amorphous silicon is insensitive to near an infrared light beam so that a photodiode or phototransistor fabricated on a silicon wafer can be used both for retinal health management and near infrared tracking of the line of sight. Since a silicon substrate substantially absorbs the visible light beam strongly, the silicon wafer needs to be thinned and perforated. The silicon wafer thinned and perforated has insufficient mechanical strength and may need to be attached to another transparent substrate serving as a support.

Optionally, the semi-transparent photodetector unit includes a multispectral photoelectric sensor or a color image sensor; and the semi-transparent photodetector unit includes three detection regions for detecting three different colors R, G and B, respectively.

Figure 12:
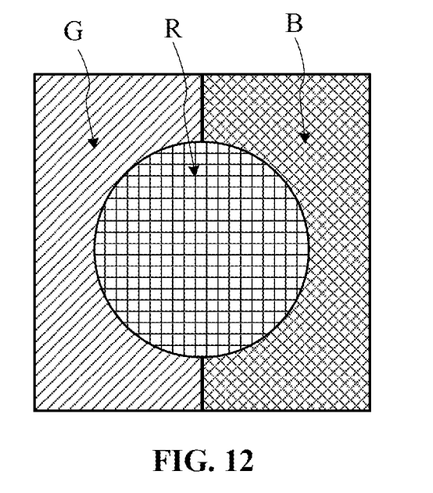
FIG. 12 to FIG. 14 are each a plan view of a semi-transparent photodetector unit according to an embodiment of the present disclosure.
Figure 13:
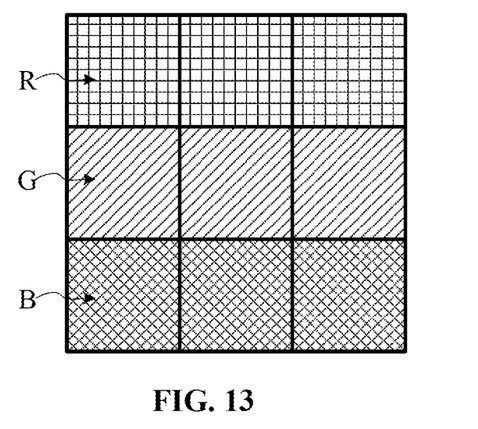
Figure 14:
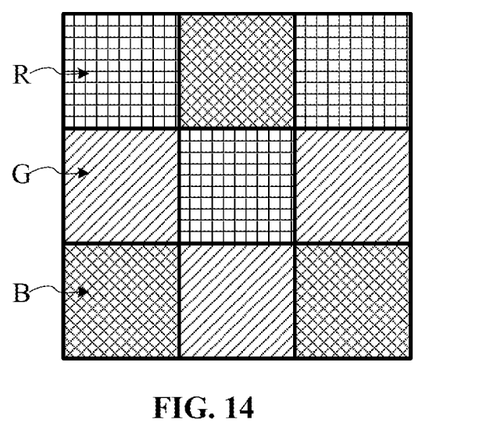

Exemplarily, FIG. 12 to FIG. 14 are each a plan view of a semi-transparent photodetector unit according to an embodiment of the present disclosure. Referring to FIG. 12 to FIG. 14, the semi-transparent photodetector unit includes a red detection region R, a green detection region G and a blue detection region B for detecting red, green and blue, respectively. In other embodiments, the three detection regions may also be arranged in other manners, which is not limited in the embodiment of the present disclosure.

Optionally, detection regions of the same color are connected to the signal processing unit via a signal bus, each detection region is connected to the signal processing unit via a respective signal line, or all detection regions are sequentially scanned and connected to the signal processing unit through a first preprocessing unit.

Figure 15:
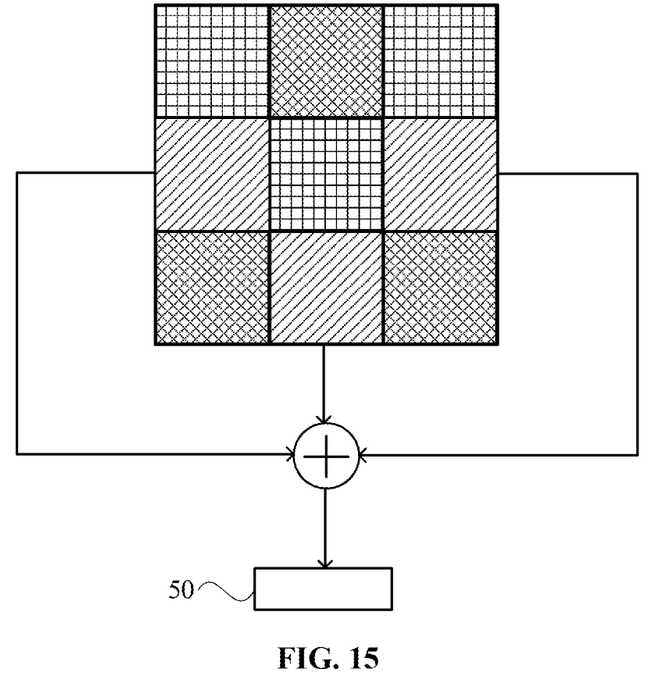
FIG. 15 to FIG. 17 are each a schematic view illustrating a connection relationship of a semi-transparent photodetector unit according to an embodiment of the present disclosure.
Figure 16:
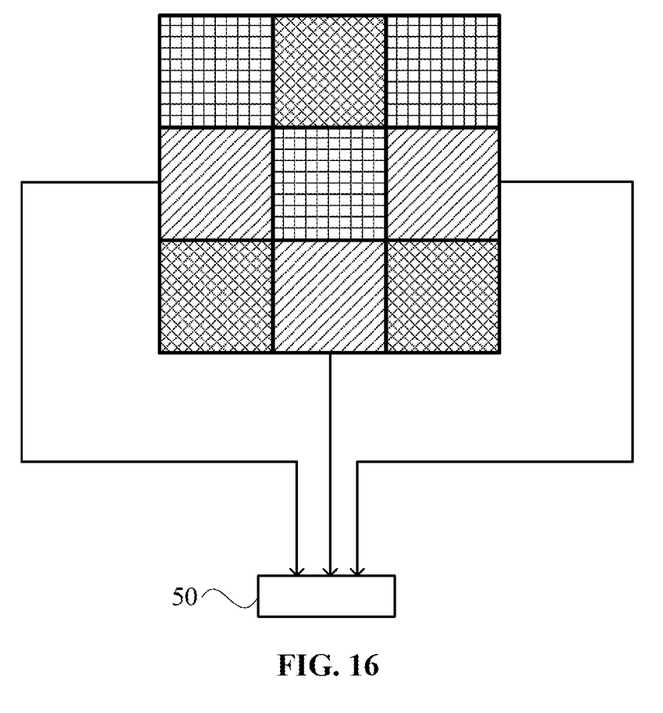
Figure 17:
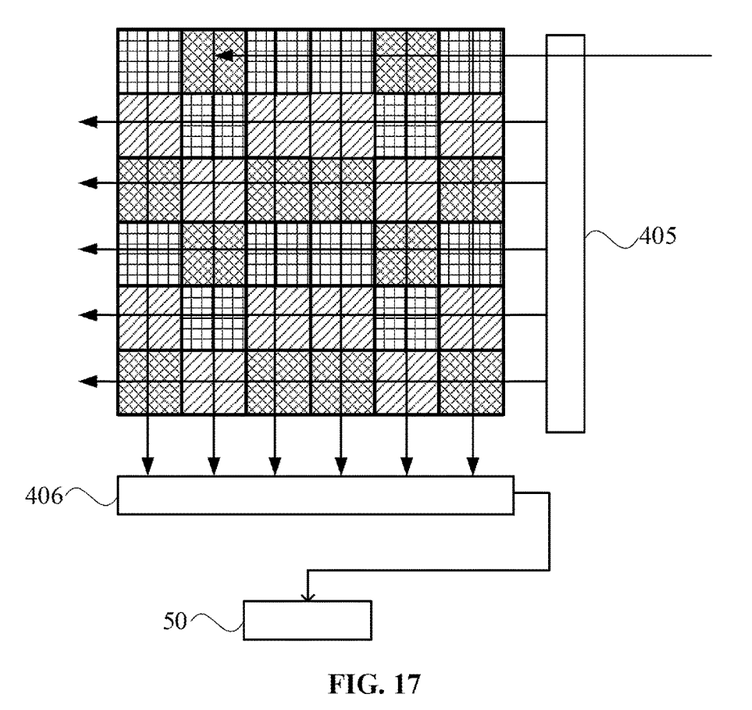

Exemplarily, FIG. 15 to FIG. 17 are each a schematic view illustrating a connection relationship of a semi-transparent photodetector unit according to an embodiment of the present disclosure. Each detection region includes a plurality of detection sub-regions (FIGS. 15 and 16 illustratively show that each detection region includes three detection sub-regions, and FIG. 17 shows that each detection region includes 12 detection sub-regions, which are not to limit the embodiments of the present disclosure), and each figure shows only one type of connection line for the detection regions. Referring to FIG. 15, all detection sub-regions in each detection region are connected to the signal processing unit 50 via the signal bus so that the number of connection lines is reduced and a circuit is simplified. Referring to FIG. 16, each detection sub-region is connected to the signal processing unit 50 via a respective signal line so that measurement accuracy can be improved, which is applicable to the case where relatively few detection regions are included. Referring to FIG. 17, the semi-transparent photodetector unit includes a scan unit 405 and a preprocessing unit 406, where the preprocessing unit 406 may include a pre-amplifier and an analog-to-digital converter, and all detection sub-regions are connected to the signal processing unit 50 through the preprocessing unit 406 in a sequential scanning manner.

When the embodiments of the present disclosure are used for retinal health management, all three connection manners in FIG. 15 to FIG. 17 may be used. However, when the embodiments of the present disclosure are used for tracking the line of sight and an overall image of distorted structured light beam needs to be acquired, the connection manner shown in FIG. 16 or FIG. 17 may be used.

Since a wearable display lens may not be planar, the photoelectric sensor in the embodiments of the present disclosure may be fabricated on or attached to a flexible transparent substrate. Such flexible substrates include an organic material, such as a transparent and high temperature resistant resin substrate such as polyvinyl chloride (PVC). Such flexible substrates also include an inorganic material, such as a thinned glass substrate with a thickness of 0.1 mm or less.

Figure 18:
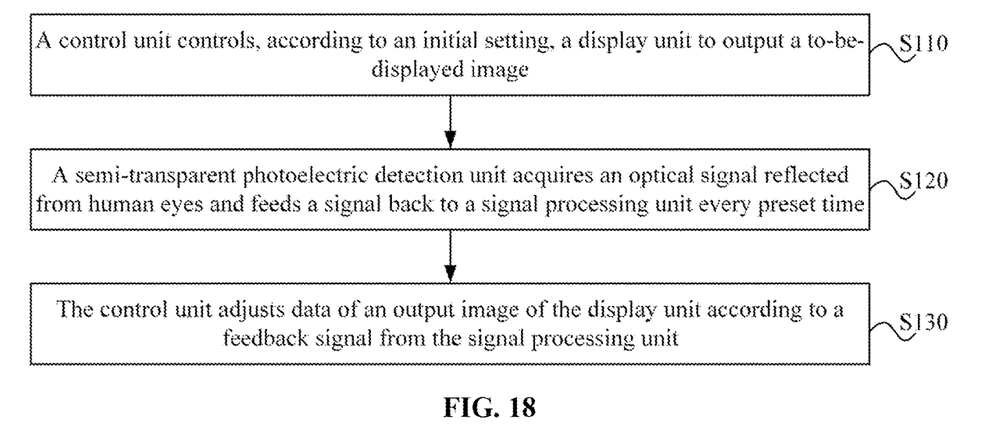
FIG. 18 is a flowchart of a driving method for a wearable display apparatus according to an embodiment of the present disclosure.

FIG. 18 is a flowchart of a driving method for a wearable display apparatus according to an embodiment of the present disclosure. The driving method is applicable to any wearable display apparatus provided in the preceding embodiments. Referring to FIG. 18, the driving method includes steps described below.

In step S110, a control unit controls, according to an initial setting, a display unit to output a to-be-displayed image.

The control unit may include an image processing chip and is configured to control the display unit to output an optical image according to a preset program. The display unit may include a silicon-based organic light-emitting display panel, so as to adapt to the requirement of the wearable display apparatus for a small volume.

In step S120, a semi-transparent photodetector unit acquires an optical signal reflected from human eyes and feeds a signal back to a signal processing unit every preset time.

The preset time may be set according to a usage situation of the wearable display apparatus, for example, may be one day, two days, a few hours or the like. The photodetector unit converts the light reflected from the human eyes to an electrical signal and feeds the electrical signal back to the signal processing unit.

In step S130, the control unit adjusts data of an output image of the display unit according to a feedback signal from the signal processing unit.

According to the technical solutions in the embodiment of the present disclosure, the control unit controls the display unit to output the optical image; the semi-transparent photodetector unit converts the light reflected from the human eyes to the electrical signal to detect a healthy state or line of sight orientation of the human eyes; the signal processing unit extract important information through analyzing the electrical signal and send the important information to the control unit; and the control unit adjusts the data of the output image of the display unit in real time according to the feedback signal from the signal processing unit, thereby enhancing and optimizing the visual experience of an image, protecting vision, ensuring safe driving, and improving user experience.

Optionally, the signal processing unit calculates a blink frequency and an eye closure time according to temporal changes of an intensity and a color of light reflected from the human eyes so as to determine a degree of fatigue of the human eyes, and the control unit issues a corresponding warning signal to a user and/or a surrounding environment of the wearable display apparatus and/or modifies the data of the output image of the display unit.

Unlike machine vision cameras, the human eyes need to blink continuously to lubricate a corneal surface, relieve tension of eyeball muscles and adjust a focusing state of eyeballs. Due to the continuous long-term use of eyes, alcohol or drugs, or mental and physical fatigue, the blink frequency is reduced and the eye closure time is prolonged. By detecting the light beam reflected from the human eyes, including changes of the intensity and the color of the light, the semi-transparent photodetector unit may determine in real time and accurately whether the reflected light beam is from a surface or an interior of an eyeball or from a surface of an eyelid at the time of eye closure. Therefore, a state of fatigue or a mental state of an observer can be grasped and corresponding measures can be further taken. Such measures include that the control unit causes the display unit to display a warning image, warns a person who is driving a vehicle or an aircraft by a sound, vibration or the like, warns a manipulator of a video game or the surrounding environment, or even taking over the vehicle or the video game regardless of a driver or the user of the wearable display apparatus. Specifically, light beam reflected back from a cornea on the surface of the eyeball or a retina on an ocular fundus during eye opening may contain various spectra from blue light to infrared light according to spectra of incident light. However, light reflected back from the surface of the eyelid during eye closure has a significantly reduced intensity and a color close to a color of the skin, such as a mixed hue of red and yellow for the yellow race, and the reflected light beam decays more seriously for the black race. Such significant differences in intensity or color of light can be captured by the semi-transparent photodetector unit.

In addition, the signal processing unit may further include a retinal health manager, and the step in which the control unit adjusts the data of the output image of the display unit according to the feedback signal from the signal processing unit includes a step described below.

The control unit adjusts, according to the feedback signal in real time, brightness and/or a color of light emitted by the display unit.

Optionally, the retinal health manager estimates a decay of a color perception ability of retinae according to spectral distribution of light reflected from eyeballs and feeds the decay back to the control unit; and the control unit adjusts a color of the output image of the display unit according to the feedback signal from the signal processing unit so that the human eyes perceive an ideal image color.

It is to be understood that due to damages of blue light to the retinae, a blue light source widely used in the display unit will result in the aging and pathological changes of the retinae, even serious diseases such as glaucoma and retinal detachment, that is, age-related macular degeneration (AMD). Due to excessive use of displays, not only the elderly but also middle-aged people, even young people, are troubled by various symptoms of AMD. In this embodiment, the retinal health manager integrated on the wearable display apparatus has the advantages of being small, lightweight, effective and reliable and can monitor accumulative damages of light radiation to the human eyes, change output amounts of various colors R, G and B of the display unit, alleviate a continuous impact on optic nerves of the human eyes, and monitor the status quo of the human eyes in real time so that all-around retinal health management is performed and optimization is performed on the safety or operation of the machine or the aircraft being operated by the user.

Optionally, the wearable display apparatus further includes a structured light projector and a second input coupler, and the signal processing unit includes a structured light processor. The step in which the control unit adjusts the data of the output image of the display unit according to the feedback signal from the signal processing unit includes a step described below.

The control unit adjusts the to-be-displayed image outputted from the display unit according to the line of sight orientation of the human eyes.

In this embodiment, information about a spatial position and direction of the eyeballs is perceived so that an image with a maximum resolution in a focal region on which the human eyes focus, that is, a region of interest (ROI), is provided to a macular region of the retina and an image with a lower resolution is provided to the retina around the macular region, thereby reducing power consumption of a display system, increasing a calculation speed, and reducing signal bandwidth. A visual focus of a viewer is acquired during a video game, commercial advertisement or video play so that valuable information feedback is provided, the video content and arrangement of the video game, advertisement or video play are optimized, and even the video game, advertisement or video play being played can be modified almost synchronously, providing the viewer with unprecedented visual experience and real-time and interactive advertising or video works.

It is to be noted that the above are only preferred embodiments of the present disclosure and technical principles used therein. It is to be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A wearable display apparatus, comprising a control unit, a display unit, a light transmission unit, a semi-transparent photodetector unit and a signal processing unit; wherein
the display unit comprises a plurality of light-emitting elements and is configured to be controlled by the control unit and output an optical image;
the light transmission unit is configured to deliver the optical image to human eyes;
the semi-transparent photodetector unit is disposed on a side of the light transmission unit facing towards the human eyes and configured to convert light reflected from the human eyes to an electrical signal;
the signal processing unit is configured to extract information through analyzing the electrical signal and send the information to the control unit;
the control unit is configured to adjust an output image of the display unit in real time including brightness and color according to the information; and
the light transmission unit and the semi-transparent photodetector unit propagate an external light beam to the human eyes.

2. The wearable display apparatus according to claim 1, wherein the semi-transparent photodetector unit comprises a plurality of detection regions and a plurality of transparent regions, each of the plurality of detection regions comprises a photosensor and a driving circuit, and a sum of areas of the transparent regions is greater than or equal to 30% and less than or equal to 90% of the area of the semi-transparent photodetector unit.

3. The wearable display apparatus according to claim 1, wherein the light transmission unit comprises an optical waveguide, a first input coupler and an output coupler, wherein
the optical waveguide is configured to propagate the optical image to the output coupler;
the first input coupler is disposed between the display unit and the optical waveguide and configured to input the optical image into the optical waveguide, and
the output coupler is disposed between the optical waveguide and the semi-transparent photodetector unit and configured to output the optical image to the human eyes through the semi-transparent photodetector unit.

4. The wearable display apparatus according to claim 3, further comprising a structured light projector and a second input coupler, wherein
the second input coupler is configured to coupling a light beam emitted from the structured light projector into the optical waveguide;
the output coupler is further configured to output the light beam to the human eyes through the semi-transparent photodetector unit;
the semi-transparent photodetector unit is configured to receive a reflected structured light beam from the human eyes; and
the signal processing unit comprises a structured light processor which is configured to track gazing direction according to a distortion of the reflected structured light beam, and the control unit adjusts the optical image according to the gazing direction.

5. The wearable display apparatus according to claim 4, wherein the reflected structured light beam is in a lattice shape, a grid shape or a parallel stripe shape.

6. The wearable display apparatus according to claim 5, wherein
the reflected structured light beam is in the grid shape and has a grid line width DL and a grid line period D21;
the semi-transparent photodetector unit further comprises a plurality of photosensors arranged in an array, each of the plurality of photosensors has a width DS and a repeating pitch D11; and
$D11 \leq 0.5 D21$, $0.25 \leq DL/D21 \leq 0.75$, and $0.1 \leq DS/D11 \leq 0.5$.

7. The wearable display apparatus according to claim 6, wherein a row direction of the grid shape is a first direction, and a row direction of the array of the plurality of photosensors is a second direction, and an angle between the first direction and the second direction is greater than or equal to 40° and less than or equal to 50°.

8. The wearable display apparatus according to claim 1, wherein the signal processing unit comprises a retinal health manager which comprises a power integrator for different color light, an analog-to-digital converter and a memory which stores mathematic models regarding aging and damage mitigation in retina.

9. The wearable display apparatus according to claim 3, wherein each of the first input coupler and the output coupler each comprise a surface relief grating or a volume holographic grating.

10. The wearable display apparatus according to claim 1, wherein the display unit comprises an organic light-emitting display panel manufactured on a semi-conductor silicon substrate.

11. The wearable display apparatus according to claim 1, wherein the semi-transparent photodetector unit comprises a plurality of photosensors, each of the plurality of photosensors comprises a photodiode or a phototransistor.

12. A driving method for a wearable display apparatus, which is applicable to the wearable display apparatus according to claim 1, comprising:
controlling, by the control unit, the display unit to output the optical image based on an initial image setting;
periodically acquiring, by the semi-transparent photodetector unit, a reflected structured light from the human eyes, converting the reflected structured light into the feedback electrical signal, and feeding back the feedback electrical signal to the signal processing unit; and
adjusting, by the control unit, an output image of the display unit including brightness and color according to the feedback electrical signal.

13. The driving method according to claim 12, wherein the signal processing unit calculates a blink frequency and an eye closure time according to temporal changes of an intensity and a color of light reflected from the human eyes so as to determine a degree of fatigue of the human eyes, and the control unit issues a corresponding warning signal to a user and/or a surrounding environment of the wearable display apparatus and/or modifies the data of the output image of the display unit.

14. The driving method according to claim 13, wherein the signal processing unit comprises a retinal health manager which estimates a decay of a color perception ability of retinae according to spectral distribution of light reflected from eyeballs and feeds the decay back to the control unit; and the control unit adjusts a color of the output image of the display unit according to the feedback signal from the signal processing unit so that the human eyes perceive an ideal image color.

15. The driving method according to claim 12, wherein the wearable display apparatus further comprises a structured light projector and a second input coupler, and the signal processing unit comprises a structured light processor; and adjusting, by the control unit, the output image of the display unit including brightness and color according to the feedback electrical signal comprises: adjusting, by the control unit, the optical image according to a line of sight orientation of the human eyes.

\* \* \* \* \*